March 10, 1970  J. GUTKOWSKI  3,499,415
INDICATOR DEVICES
Filed Feb. 15, 1968
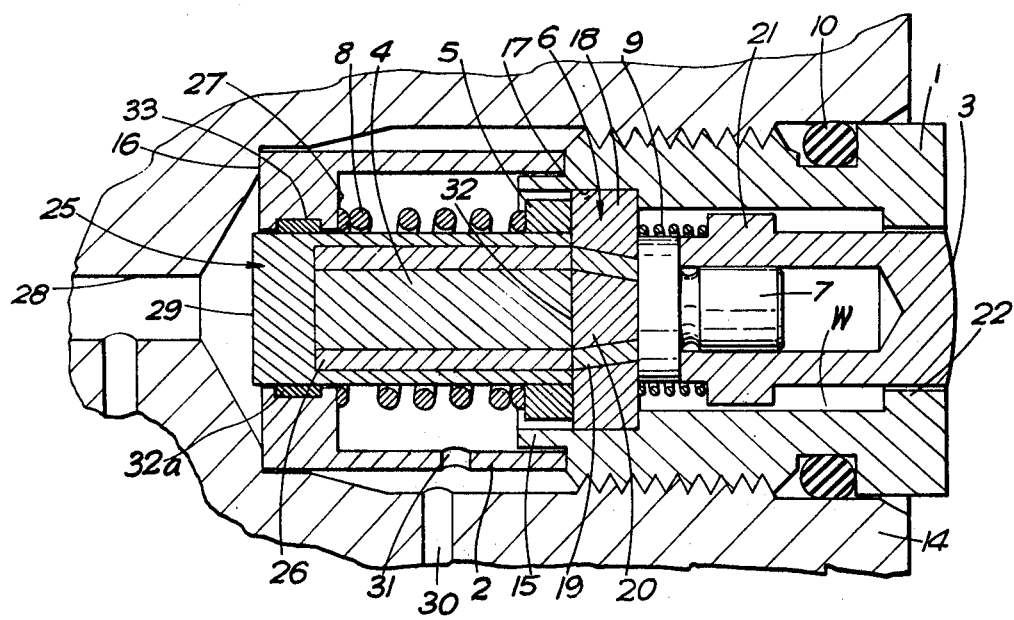
INVENTOR
Janusz Gutkowski
BY Watson, Cole, Grindle + Watson
ATTORNEYS

United States Patent Office 3,499,415
Patented Mar. 10, 1970

3,499,415
INDICATOR DEVICES
Janusz Gutkowski, Lewes, England, assignor to BTR Industries Limited, London, England, a British company
Filed Feb. 15, 1968, Ser. No. 705,752
Claims priority, application Great Britain, Feb. 17, 1967, 7,645/67
Int. Cl. G01l *19/12*
U.S. Cl. 116—70     6 Claims

ABSTRACT OF THE DISCLOSURE

A device for indicating when a fluid pressure or pressure difference exceeds a predetermined value. The device has a sensing member and an indicating member which may be held together magnetically, and which are separable when a predetermined fluid pressure is applied to overcome magnetic attraction between them. When the two members are separated the indicating means is spring urged into an indicating position.

---

The invention relates to a device for indicating when a fluid or a pressure difference exceeds a predetermined value.

The invention provides a device for indicating when a fluid pressure exceeds a predetermined value and comprising a sensing member movable towards and away from a first position, the member being open to a source of fluid pressure in a sense to urge the member away from the first position, and an indicating member movable between second and third positions, one of the members having a single pole piece of magnetic material and the other member having two spaced apart pole pieces of magnetic material the said two pieces being magnetically connected to provide an open magnetic circuit, and the open circuit containing at least one permanent magnet, the arrangement being such that the two pole pieces at the ends of the open circuit face towards the single pole piece and when the sensing member is in the first position and the indicating member is in the second position the members are in magnetic communication with the said single pole piece closing the magnetic circuit, resilient means being provided to move the indicating member to the third position when the fluid pressure moves the sensor member away from the first position.

Preferably it is the sensor member which is the said other member. The said other member may comprise a pot magnet with the free ends of the magnet and the pot forming the two pole pieces.

There may be fixed pole pieces in the magnetic circuit between the pot magnet and the single pole piece.

Preferably there is preloaded spring means arranged to urge the sensing member towards said first position.

The invention also provides a device of the type described above and adapted for indicating when a pressure difference exceeds a predetermined value, having a second source of fluid pressure arranged to urge the sensing member towards its first position against the action of the first source of fluid pressure and assisting the preloaded spring means.

It is preferred that the sensing member and the indicating member are arranged for movement along paths which are axially aligned, and are disposed axially of a generally cylindrical recess in a body member. In this form the sensing member and the indicating member may be formed as bodies of revolution which are disposed axially of a generally cylindrical recess in a body member.

It is preferred that the body member is capable of making sealing engagement with a housing, and has an aperture or apertures to connect the first sensing member to the source or sources of pressure in the housing.

In one form the sensing member is cylindrical and has an annular projection outstanding from its surface at or near its end nearer to the indicator member, and a preloaded spring means is disposed between the projection and an abutment on the body.

The indicating member may be spring urged towards the third position.

It is preferred that the indicating member remains in its third position after the sensing member has moved away from, and back to its first position and is manually movable from its third position to its second position.

It is further preferred that the indicating member has a portion which forms a press button, and this portion is arranged to project outwardly from a surrounding surface when the indicating member is in its third position so as to allow the member to be moved manually.

The invention includes a fluid filter assembly having a device as described above for indicating a pressure difference in which the first source and the second source communicate with the fluid pressures upstream and downstream of the filter respectively.

A specific example of an indicating device according to the invention will now be described with reference to the accompanying drawing which is a cross-section through the device.

A body 1 is screw-threaded into a housing 14 there being a sealing ring 10 between the body and the housing.

A cylindrical sleeve 2 fits over an annular projection 15 on the body 1 and is wedged between the body and a face 16 within the housing to form a seal. An additional elastomeric seal may be also provided between the sleeve 2 and the face 16.

A pole asembly 6 fits within a bore 17 in the body 1 and is secured and sealed thereto. The assembly 6 comprises an outer ring 18 of magnetic material, a ring 19 of non-magnetic material and a pole piece 20 of magnetic material.

An indicating member 3 is slidable in an extension of the bore 17 and is attached to a pole piece 7 of magnetic material. There is a spring 9 tending to force the member 3 away from the assembly 6 and there is an annular rib 21 around the member 3 which is engageable with an annular abutment 22 to limit the extent of such movement.

The spring 9 surrounds the inner end of the indicating member 3, and is disposed between and abuts the outer ring 18 and the opposed face of the rib 21.

The sleeve 2 provides a bearing for a sensing member comprising a pot magnet having a pot 25 of magnetic material which contains a sleeve 26 of non-magnetic material surrounding a bar magnet 4. There is an annulus 5 attached to one end of the sensor member and there is a spring 8 acting between the annulus 5 and an annular stop 27 on the sleeve 2.

There may be a low friction seal 32a disposed between the sleeve 2 and the pot magnet 25, and arranged to impede leakage between the upstream and downstream sides of the device. The seal is advantageously of polytetrafluoroethylene [PTFE] and is located in an annular recess 33 in the wall of the sleeve 2 through which the magnet is slidable.

In operation of the device a lower pressure is fed via a bore 28 in the housing to the end face 29 of the sensing member and a higher pressure is fed via a bore 30 in the housing and a hole 31 in the sleeve 2 to the other end face 32 of the sensing member. The pressures may be, for example, the pressures upstream and downstream of a filter assembly.

The member 3 is normally retained in the position shown in the drawing as the pole piece 7 is attracted to the magnet 4 via the outer ring 18 and the pole piece 20. The pole piece 7 thus completes the magnetic circuit through the magnet 4, the pot 25 and the pole pieces 18 and 20.

When the force provided by the upstream pressure acting on the face 32 exceeds the combined forces of the downstream pressure acting on the face 29, the spring 8 and the magnetic attraction between the sensing member and the pole assembly 6 the sensing assembly is forced in the direction of the bore 28.

This movement releases the pole piece 7 and the member 3 is moved outwardly of the body 1 by the spring 9.

When the excess pressure difference has been removed the first sensor returns to the first position but the device continues to indicate until the device is reset by pushing the member 3 inwardly, towards the body 1 to re-engage the armature in the magnetic circuit.

I claim:

1. A device for indicating when a fluid pressure exceeds a predetermined value and comprising a sensing member movable towards and away from a first position, the member being open to a source of fluid pressure in a sense to urge the member away from the first position, and an indicating member movable between second and third positions, one of the members having a single pole piece of magnetic material and the other member having two spaced apart pole pieces of magnetic material, the said two pieces being magnetically connected to provide an open magnetic circuit, and the open circuit containing at least one permanent magnet, the arrangement being such that the two pole pieces at the ends of the open circuit face towards the single pole piece and when the sensing member is in the first position and the indicating member is in the second position the members are in magnetic communication with the said single pole piece closing the magnetic circuit, resilient means being provided to move the indicating member to the third position when the fluid pressure moves the sensing member away from the first position.

2. A device as claimed in claim 1 in which the said other member comprises a pot magnet with the free ends of the magnet and the pot forming the two pole pieces.

3. A device as claimed in claim 2 in which there are fixed pole pieces in the magnetic circuit between the pot magnet and the single pole piece.

4. A device as claimed in claim 1 in which there is preloaded spring means arranged to urge the sensing member towards said first position, which device is adapted for indicating when a pressure difference exceeds a predetermined value, having a second source of fluid pressure arranged to urge the sensing member towards its first position against the action of the first source of fluid pressure and assisting the preloaded spring means.

5. A device as claimed in claim 1 in which the indicating member is spring urged towards its third position and remains in its third position after the sensing member has moved away from, and back to its first position, and is manually movable from its third position to its second position, and in which the indicating member has a portion which forms a press button, which portion is arranged to project outwardly from a surrounding surface when the indicating member is in its third position so as to allow the member to be moved manually.

6. A device as claimed in claim 1 in which:
 (a) the sensing member is the said other member,
 (b) the sensing member and the indicating member are formed as bodies of revolution,
 (c) the moving parts of the device are housed in a generally cylindrical recess in a body member,
 (d) the moving parts are axially aligned and axially movable in the recess,
 (e) there is a housing, the body member is capable of making sealing engagement with the housing, and has an aperture to connect the first sensing member to a source of pressure in the housing,
 (f) the sensing member has an annular projection outstanding from its surface adjacent its end nearer to the indicating member, and
 (g) a preloaded spring means disposed between the projection and an abutment on the body.

References Cited

UNITED STATES PATENTS

| 2,669,707 | 2/1954 | Ehrman. | |
| 3,154,049 | 10/1964 | Smith et al. | 116—70 |
| 3,212,471 | 10/1965 | Willis | 116—70 |

FOREIGN PATENTS 1,345,119  10/1963  France.

LOUIS J. CAPOZI, Primary Examiner

U.S. Cl. X.R.

210—90